United States Patent [19]

Thacker

[11] Patent Number: 5,338,938
[45] Date of Patent: Aug. 16, 1994

[54] GAMMA RADIATION FIELD INTENSITY METER

[75] Inventor: Louis H. Thacker, Knoxville, Tenn.

[73] Assignee: Martin Marietta Energy Systems, Inc., Oak Ridge, Tenn.

[21] Appl. No.: 44,678

[22] Filed: Apr. 9, 1993

[51] Int. Cl.⁵ .......................................... G01T 1/142
[52] U.S. Cl. ...................................... 250/377; 250/376
[58] Field of Search ................................ 250/376, 377

[56] References Cited

U.S. PATENT DOCUMENTS

| | | | |
|---|---|---|---|
| 2,610,302 | 9/1952 | Christian | 250/376 |
| 2,683,222 | 7/1954 | Failla et al. | 250/376 |
| 2,728,861 | 12/1955 | Glass . | |
| 2,980,799 | 4/1961 | Bongrain et al. | 250/376 |
| 2,986,640 | 5/1961 | Grimm | 250/376 |
| 3,614,444 | 10/1971 | Nirschl . | |
| 3,814,940 | 6/1974 | Ainsworth et al. | 250/389 |
| 3,878,496 | 4/1975 | Erickson | 250/374 |
| 4,415,237 | 11/1983 | Fox | 250/336.1 |
| 4,430,569 | 2/1984 | Manning | 250/377 |
| 4,864,543 | 9/1989 | Ward et al. | 365/221 |
| 4,878,190 | 10/1989 | Darley et al. | 364/752 |
| 4,963,747 | 10/1990 | Thacker | 250/388 |

Primary Examiner—Carolyn E. Fields
Attorney, Agent, or Firm—Edward A. Pennington; George L. Craig; James M. Spicer

[57] ABSTRACT

A gamma radiation intensity meter measures dose rate of a radiation field. The gamma radiation intensity meter includes a tritium battery emitting beta rays generating a current which is essentially constant. Dose rate is correlated to an amount of movement of an electroscope element charged by the tritium battery. Ionizing radiation decreases the voltage at the element and causes movement. A bleed resistor is coupled between the electroscope support element or electrode and the ionization chamber wall electrode.

12 Claims, 2 Drawing Sheets

GAMMA RADIATION FIELD INTENSITY METER

This invention was made with Government support under contract DE-AC05-840R21400 and PO 80X-SH104 awarded by the U.S. Department of Energy to Martin Marietta Energy Systems, Inc. and the Government has certain rights in this invention.

BACKGROUND OF THE INVENTION

1. Field of the Invention

The present invention relates to a gamma radiation field intensity meter, and more particularly to an electroscope-type dosimeter which is supplied a constant current from an energy source to provide rate of radiation dose rather than total accumulated dose.

2. Background of the Related Art

Electroscope-type dosimeters have been developed over the years to measure the accumulated or total dose of gamma radiation. Specifically, the prior art electroscope-type dosimeter determines the total gamma radiation exposed to it. Typically, the electroscope-type dosimeter, more commonly known as the Lauritsen electroscope, is precharged by a conventional dosimeter charger. The electroscope-type dosimeter includes a quartz fiber and a metal frame used as a charge acceptor, and during the charging process a potential is applied between the frame and the exterior of the dosimeter. Electrical charges of the same polarity appear on both the fiber and frame, causing the fiber to be repelled from the frame by a distance proportional to the applied voltage. The chamber walls or exterior of the electroscope-type dosimeter provides an electrostatic shield for the electroscope-type dosimeter. If the electroscope-type dosimeter is exposed to additional ionizing gamma radiation, the charge on the quartz fiber decreases and the fiber tends to return to the discharge position which is closer to the frame. An image of the fiber in the new position resulting from the additional gamma radiation is projected onto a reticle scale and viewed through an eyepiece lens of the dosimeter. The scale, typically calibrated in Milliroentgens or Roentgens, indicates total accumulated radiation dose, and may be read by looking through the eyepiece toward a lamp or other light source. Thus, the prior art electroscope-type dosimeters have been unable to measure the radiation dose rate experienced when exposed to an ionizing gamma radiation field.

It is, therefore, desirable to reliably measure the radiation dose rate which a meter is exposed to in a radiation field to further indicate whether the ionizing gamma radiation field is dangerous. In addition, it is also desirable that the gamma radiation field intensity meter be compact.

SUMMARY OF THE INVENTION

It is, therefore, an object of the present invention to provide a gamma radiation field intensity meter which is able to measure the dose rate at which the meter is exposed to the ionizing gamma radiation.

It is another object of the present invention to provide a gamma radiation field intensity meter which is compact.

To achieve these and other objects, the gamma radiation intensity meter of the present invention includes a current source generating a current which is essentially constant and a dose rate determining unit which determines the dose rate of the radiation field exposed to the gamma radiation intensity meter. The dose rate determining unit includes an ionization chamber having gas, a conductive frame disposed in the ionization chamber conducting the current generated by the tritium battery and a charge accepting fiber connected to the conductive frame. The gamma radiation intensity meter also includes a resistor, connected between the conductive frame and the ionization chamber wall which conducts the current forming a potential across the resistor. When the gamma radiation intensity meter is exposed to a radiation field, the radiation field penetrates the gamma radiation intensity meter and ionizes the gas in the ionization chamber forming ionized gas, and the ionized gas conducts a current proportional to the radiation field intensity from the conductive frame to the wall of the ionization chamber, thereby shunting that amount of current away from the resistor. The reduced current through the resistor proportionally reduces the voltage on the conductive frame and the fiber and the charge accepting fiber moves toward the conductive frame to a new position indicating the dose rate.

These, together with other objects and advantages which will be subsequently apparent, reside in the details of construction and operation as more fully hereinafter described and claimed, with reference being had to the accompanying drawings forming a part hereof, wherein like numerals refer to like parts throughout.

DETAILED DESCRIPTION OF THE PREFERRED EMBODIMENT

Figure 1:
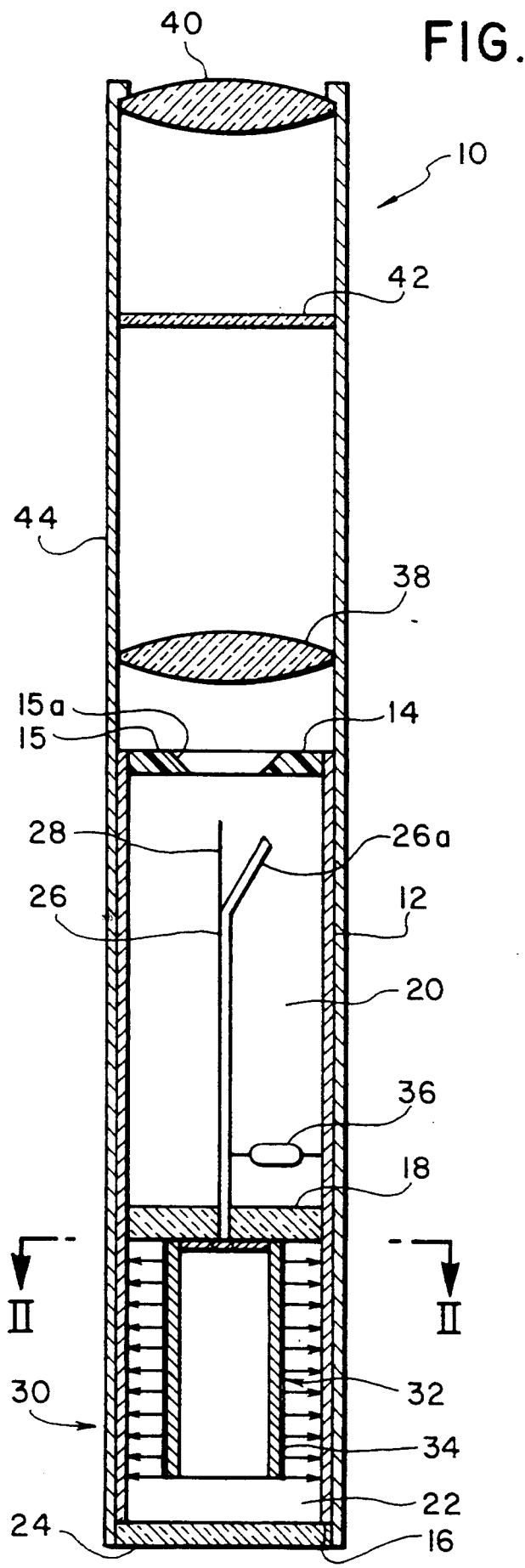
FIG. 1 is a vertical cross-sectional view of a gamma radiation field intensity meter according to a preferred embodiment of the present invention.
Figure 2:
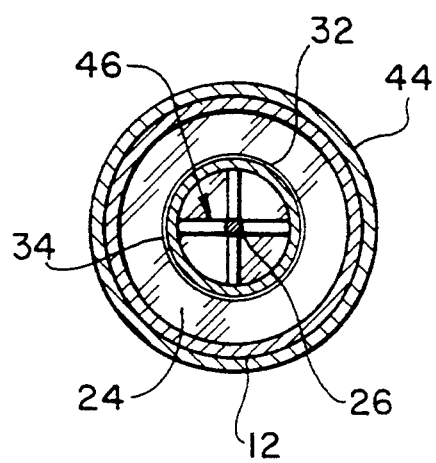
FIG. 2 is a horizontal cross-sectional view taken along line II—II of FIG. 1.

Referring to FIGS. 1 and 2, a radiation field intensity meter 10 includes a first electrode 12 made from an electrically conductive material, such as a suitable metal. Alternatively, the electrode 12 can be made of a plastic or other non-conductive material having a conductive coating on the inside thereof.

The electrode 12 is a hollow cylindrical sleeve having opposite axial ends 14 and 16. An end plate 15 made of non-conductive material is fixedly disposed in the end 14 and includes a window 15a to permit viewing into the electrode 12. A transparent disk 18 fixedly disposed and hermetically sealed transversely in the electrode 12 at a suitable position between the opposite ends divides the interior space of the electrode 12 into an ionization chamber 20 and a battery chamber 22. The disk 18 is made of clear plastic, glass or other suitable materials to allow light to pass through the battery chamber 22. A second transparent disk 24, made of the same type of material as the disk 18, seals the battery chamber 22, which is evacuated to create a vacuum therein. Also, the transparent material permits light to pass through the battery chamber 22, thus illuminating the interior of the electrode 12.

The disk 18 provides support for a second electrode 26 which is made of a suitable metallic or otherwise conductive material. The electrode 26 has an angled end 26a and supports an electroscope element 28, in the form of a fiber. This arrangement of a fiber and supporting structure or "frame" is standard for a Lauritsen-type electroscope. When the electrode 26 and element 28 are charged, the position of element 28 with respect to the end 26a of the electrode 26 varies in accordance with the amount of charge.

The electrode 26 and electroscope element 28 are continuously charged by a fixed, small current from an isotopic battery 30. In the illustrated embodiment, the battery is a beta battery which emits beta radiations (electrons) as a source material decays. A cylindrical support 32, preferably made of conductive metal, is coated with a film 34 of beta source material. For a tritium source, a hydride coating referred to as "tritide" can be used. In other embodiments, the tritium source material can be adsorbed into and onto the metal support 32. The tritium source battery illustrated will produce a high open-circuit voltage of, for example, 18 KV. For still higher voltages, other source materials may be used, such as Ni-63 which produces 63 KV. These sources emit only a low energy beta particle and are easily sealed and shielded for complete safety in the present application.

The beta particle emissions are represented by the arrows in FIG. 1, and indicate a current flow to the electrode 12. The current flow is small, such as $2 \times 10^{-10}$ amps for about 7 micro-gms of tritium. The current passes through a large resistance 36, such as a $10^{12}$ ohm resistor, to produce an appropriate voltage, such as 200 V (which is the same as the existing integrated dose dosimeters) for a fully-charged indication on the electroscope element 28.

When the meter 10 is placed in an ionizing radiation field, a fraction of the battery current linearly proportional to the intensity of the radiation field is shunted through the air-filled ionization chamber 20, and the voltage on the electroscope element 28 is proportionally reduced. The reduced voltage will cause the element 28 to move towards the end 26a of the electrode 26, and this movement can be observed by a person carrying the meter 10 for an instantaneous indication of the dose rate. The movement can be observed and calibrated for dose rate using conventional observation components found in known portable dosimeters manufactured by Bendix Corporation and Landsverk Electrometer Company and sold under the model designations CD V-138, CDE V-730, CD V-740 and CD V-742. These components are illustrated in FIG. 1 as an objective lens 38, an eyepiece lens 40, and a calibrated reticle 42, all of which are mounted in a barrel 44 which houses all components of the meter 10. The opening 15a makes the electroscope element 28 readable from above the disk 14. Moreover, the transparency of both disks 18 and 24 allows light to pass through the meter 10, thus making the element 28 visible for observation.

Referring to FIG. 2, the electrode 26 is connected to the support 32 through a spider 46 having four legs. Since the support 32 is hollow, it is preferable to use the spider 46 to interconnect the support 32 to the electrode 26 so as to allow light to pass therethrough. This enhances the readability of the dose rate.

The visual electroscope readout is calibrated in dose-rate and the worker can tell at a glance the degree of danger he is in at the instant of the reading. When in a radiation field, the ionization current through the dosimeter would parallel the resistor 36 and a new, lower equilibrium voltage would be assumed for each radiation level, thus indicating the strength of the radiation field. If lower electroscope voltages are desired, smaller sources and lower resistances can be used.

Figure 3:
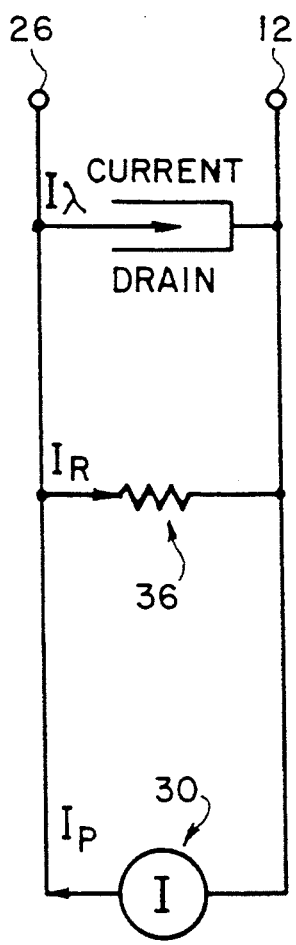
FIG. 3 is a wiring schematic diagram of the gamma radiation field intensity meter of FIGS. 1 and 2.

Referring to FIG. 3, the battery 30 produces a current of, for example, $2 \times 10^{-10}$ amps ($I_\beta$) which remains constant. The current through the resistor 36 ($I_R$) with no radiation exposure is the same as the output current of the battery 30. In the presence of ionizing radiation, a current drain is established between the electrode 12 and the electrode 26 which causes a drop in the current through the resistor 36 and thus a drop in the potential on the electrode 26 and element 28. This drop is a function of the amount of ionization, and thus, the element 28 moves in accordance to the amount of current drained.

The ionization current $I_\gamma$ thus increases at the expense of resistor current. When the radiation field intensity meter 10 is exposed to gamma radiation, the ionization chamber, which is represented as current drain, diverts more of constant current $I_\beta$ through the ionization chamber. Accordingly, resistor current $I_R$ becomes smaller, and therefore, less current flows through resistor. Thus, the voltage drop across resistor decreases, and therefore, the voltage on element 28 in the ionization chamber is also decreased. As a result of the decrease in charge on the fiber, the fiber moves toward the frame in a new position, thereby indicating radiation dose rate. The volts on the movable electroscope element or fiber $$E_o = (2 \times 10^{-10} - V \times 9.25 \times 10^{-14} y) 10^{12}$$

where V is the ionization chamber volume, y is Roentgens/hr (R/hr).

Figure 4:
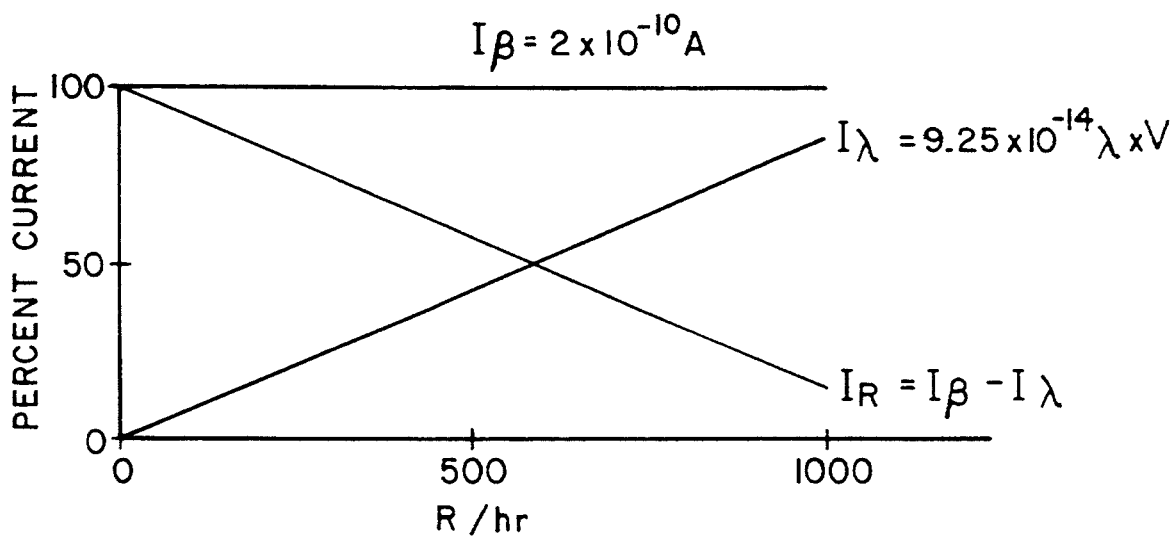
FIG. 4 is a graph showing the relationship between the total current, resistor current, and bleed current.

Referring to FIG. 4, the current flowing from the current source, i.e. the beta battery, remains constant at, for example, $2 \times 10^{-10}$ amps throughout a range of radiation exposure. The resistance of the resistor is fixed at, for example, $10^{12}$ ohms. The current through the ionization chamber increases substantially linearly as the gamma radiation exposure increases. Given the above, one can easily calibrate a reticle to correlate voltage and thus fiber position to dose rate in R per hour, as shown on the horizontal axis of FIG. 4.

While the present invention is particularly well suited for detecting gamma radiation, it can be used to detect other electromagnetic ionization radiations, such as X-rays. Moreover, while the described embodiments focus on beta radiation batteries, alpha batteries can also be employed. In any event, the isotopic source material can be placed on the carrier in any convenient manner, such as a coating or having the source material adsorbed on the surface.

The many features and advantages of the invention are apparent from the detailed specification, and thus, it is intended by the appended claims to cover all such features and advantages of the invention which fall within the true spirit and scope of the invention. For example, the present invention is not limited to the tritium battery, but can be used with any constant current source such as a Ni-63 battery or an electronic current source. Further, since numerous modifications and variations will readily occur to those skilled in the art, it is not desired to limit the invention to the exact construction and operation illustrated and described, and accordingly, all suitable modifications and equivalents may be resorted to, falling within the scope of the present invention.

What is claimed is:

1. A gamma radiation intensity meter, comprising:
   a first electrode defining an ionization chamber containing a gas;
   a second electrode disposed within the first electrode and having an electroscope element whose position relative to the second electrode is a function of a voltage applied to the second electrode;
   constant current source means for establishing a fixed current irrespective of voltage between the first and second electrodes; and
   resistance means for establishing a voltage between the first and second electrodes by means of flow of all or part of the constant current applied by the current source means, a fraction of the fixed current substantially linearly proportional to the intensity of a radiation field being shunted through the ionization chamber, thereby changing the potential and the position of the electroscope element,
   wherein the constant current source means has an open-circuit voltage of between 18 KV and 63 KV.

2. A radiation intensity meter according to claim 1, wherein the current source means is a beta radiation battery.

3. A radiation intensity meter according to claim 2, wherein the beta radiation battery includes a first conductive hollow cylindrical member carrying a quantity of tritium as a beta source.

4. A radiation intensity meter according to claim 3, wherein the tritium is coated on an outer surface of the hollow cylindrical member.

5. A radiation intensity meter according to claim 3, wherein the first electrode includes a second conductive hollow cylindrical member having first and second opposite axial ends, a first transverse disk mounted between the opposite axial ends, and a second transverse disk mounted over the first end, thereby defining an evacuated battery chamber between the first and second transverse disks, and the ionization chamber between the first transverse disk and the second end.

6. A radiation intensity meter according to claim 5, further comprising a barrel having the second electrode mounted therein, and a viewing system for observing the electroscope element movement.

7. A radiation intensity meter according to claim 5, wherein the viewing system includes a lens system and a reticle, the reticle being calibrated according to dose accumulation rate.

8. A radiation intensity meter according to claim 5, wherein the first and second transverse disks are made of an optically transparent material.

9. A radiation intensity meter according to claim 1 wherein the electroscope element comprises a charge accepting fiber connected to the second electrode.

10. A radiation intensity meter according to claim 1, wherein said current source means comprises a tritium battery.

11. A radiation intensity meter according to claim 1, wherein said current source means comprises an Ni-63 battery.

12. A gamma radiation intensity meter, comprising:
    a tritium battery emitting beta rays generating a current which is essentially constant;
    an ionization chamber containing gas;
    a conductive frame disposed in said ionization chamber conducting said current generated by said tritium battery and a charge accepting fiber connected to said conductive frame; and
    a resistor, connected to said conductive frame and conducting said current forming a first potential across said resistor,
    wherein when the gamma radiation intensity meter is exposed to said radiation field, said radiation field penetrates the gamma radiation intensity meter and ionizes said gas in said ionization chamber forming ionized gas, and said ionized gas conducts a portion of said current from said conductive frame forming another potential across said resistor, and
    wherein said charge accepting fiber moves toward said conductive frame indicating said dose rate when said another potential is smaller than said first potential.

* * * * *